United States Patent [19]

Golden et al.

[11] Patent Number: 5,531,809
[45] Date of Patent: Jul. 2, 1996

[54] PRETREATMENT LAYER FOR CO-VSA

[75] Inventors: Timothy C. Golden, Allentown; Paul A. Webley, Macungie; Steven R. Auvil, Macungie; Wilbur C. Katz, Macungie, all of Pa.

[73] Assignee: Air Products and Chemicals, Inc., Allentown, Pa.

[21] Appl. No.: 307,985

[22] Filed: Sep. 14, 1994

[51] Int. Cl.$^6$ .................................................. B01D 53/047
[52] U.S. Cl. .......................... 95/101; 95/102; 95/103; 95/105; 95/122; 95/128; 95/132; 95/140; 96/130; 96/132
[58] Field of Search ........................... 95/98, 100–105, 95/117–122, 128, 140; 96/108, 131–133

[56] References Cited

U.S. PATENT DOCUMENTS

| | | | |
|---|---|---|---|
| Re. 32,590 | 2/1988 | Sakuraya et al. | 95/101 |
| 3,237,379 | 3/1966 | Kant et al. | 95/98 |
| 3,719,025 | 3/1973 | Heinze et al. | 95/98 |
| 4,019,879 | 4/1977 | Rabo et al. | 95/140 |
| 4,316,880 | 2/1982 | Jockel et al. | 95/103 X |
| 4,326,858 | 4/1982 | Benkmann | 95/98 |
| 4,439,213 | 3/1984 | Frey et al. | 95/98 |
| 4,470,829 | 9/1984 | Hirai et al. | 95/140 |
| 4,587,114 | 5/1986 | Hirai et al. | 423/247 |
| 4,636,225 | 1/1987 | Klein et al. | 96/132 X |
| 4,711,645 | 12/1987 | Kumar | 95/98 |
| 4,726,816 | 2/1988 | Fuderer | 95/98 |
| 4,743,276 | 5/1988 | Nishida et al. | 95/140 |
| 4,913,709 | 4/1990 | Kumar | 95/100 |
| 4,914,076 | 4/1990 | Tsuji et al. | 502/407 |
| 4,915,711 | 4/1990 | Kumar | 95/101 |
| 4,917,711 | 4/1990 | Xie et al. | 95/106 |
| 4,950,311 | 8/1990 | White, Jr. | 95/98 |
| 4,959,083 | 9/1990 | Garrett | 95/98 |
| 5,026,406 | 6/1991 | Kumar | 95/101 |
| 5,096,470 | 3/1992 | Krishnamurthy | 95/102 |
| 5,126,310 | 6/1992 | Golden et al. | 502/417 |
| 5,228,888 | 7/1993 | Gmelin et al. | 95/117 X |

FOREIGN PATENT DOCUMENTS

| | | | |
|---|---|---|---|
| 60-097022 | 5/1985 | Japan | 95/98 |
| 62-007416 | 1/1987 | Japan | 96/132 |
| 62-148304 | 7/1987 | Japan | 96/132 |
| 1-080418 | 3/1989 | Japan | 95/140 |
| 1-245827 | 10/1989 | Japan | 96/133 |
| 2-283608 | 11/1990 | Japan | 95/140 |
| 2055609 | 3/1981 | United Kingdom | 95/98 |
| 2078128 | 1/1982 | United Kingdom | 96/132 |

OTHER PUBLICATIONS

F. Kasuya and T. Tsuji. "High Purity CO Gas Separation by Pressure Swing Adsorption." *Gas Separation & Purification* Dec. 1991: 242–246.

Walker, David G. "Making and Using CO." *Chemtech* May 1975: 308–311.

*Primary Examiner*—Robert Spitzer
*Attorney, Agent, or Firm*—Geoffrey L. Chase

[57] ABSTRACT

The present invention is an apparatus and method for preferentially adsorbing carbon monoxide from a gas stream containing carbon monoxide in the presence of water and potentially ammonia while not adsorbing methane, hydrogen or carbon dioxide which may be present in the gas stream using an adsorbent of a supported cuprous compound situated downstream serially from a pretreatment adsorbent of 3A zeolite which protects the cuprous compound from water. An additional pretreatment layer of a basic metal compound to protect the acid-unstable 3A zeolite layer is also contemplated.

10 Claims, No Drawings

PRETREATMENT LAYER FOR CO-VSA

TECHNICAL FIELD

The present invention is directed to the field of carbon monoxide adsorption from gas streams which also contain moisture and, potentially, ammonia. More preferably, the present invention is directed to recovery of a carbon monoxide product by the adsorption of carbon monoxide from a gas stream using a supported cuprous adsorbent wherein the gas stream also contains moisture and potentially ammonia which are detrimental to the cuprous compound of the adsorbent.

BACKGROUND OF THE INVENTION

Carbon monoxide (CO) is used widely in the chemical industry as a raw material in the synthesis of various chemicals including acetic acid, polyurethane foams and polycarbonate plastics. The primary method for production of CO is the steam reforming of methane to produce a synthesis gas mixture. The key components of the synthesis gas include CO, $H_2$, $CO_2$, $CH_4$, $N_2$ and $H_2O$. This synthesis gas mixture must then be separated to produce a high purity CO product. There are three basic methods for the separation and purification of CO including cryogenic distillation, absorption (COSORB) and pressure swing adsorption. Pressure swing adsorption processes for the production of CO utilize adsorbents that have high adsorption selectivity for CO over $H_2$, $CH_4$, $N_2$ and $CO_2$. However, many CO selective adsorbents consist of CuCl supported on inorganic materials, like alumina, and are adversely effected by water vapor. Firstly, water vapor is strongly adsorbed by inorganic-based adsorbents and thereby reduces the effective CO capacity of the adsorbent. Secondly, water vapor may oxidize the active CuCl to inactive Cu(OH)Cl. Finally, water may also solubilize chloride containing species on the adsorbent surface and cause corrosion problems. Hence, the effective removal of water during the pressure swing adsorption production of CO is a difficult problem that must be resolved for the technology to be successful.

In a paper by Kasuya and Tsuji (Gas Separation and Purification, Volume 5, page 242, December 1991), a PSA process developed by Kobe Steel and Kansai Coke for the production of CO is described. In this process, water vapor is removed in a two-bed thermal swing adsorption system prior to a four bed PSA for the production of CO. Thus, water removal is accomplished prior to the PSA system.

In U.S. Pat. No. 4,743,276 a method and adsorbent used for separating CO is disclosed. This patent describes the use of zeolites ion exchanged with various transition metal cations as CO selective adsorbents which operate in a PSA system with an elevated adsorption temperature ranging from 50° to 250° C. The patent notes that these types of adsorbents are susceptible to water vapor. This problem is addressed by cooling the inlet gas stream under pressure to effectively condense out the water in the feed gas. The dry gas is then sent to the PSA.

In U.S. Pat. No. 4,914,076 at column 5, lines 41–46, a recognition that pretreatment of an unspecified type may be necessary for a copper based CO adsorbent.

U.S. Pat. No. 4,917,711 discloses copper based CO adsorbents which may have a zeolitic support for the copper compound-CO adsorbent.

U.S. Pat. No. 4,470,829 discloses an adsorbent for CO which has a carbon intermediate support layer. At column 4, lines 46–63, the patent describes the adsorbents stability in the presence of water.

U.S. Pat. No. 4,019,879 discloses a copper on zeolite support that is tolerant of moisture-containing CO feed gases. The patent at column 1, lines 31–45 describes the COSORB process of absorption in a liquid using temperature swing absorption. The drying operation is also operated in a temperature swing manner using adsorption. See CHEMTECH, May 1975, pp 308–311.

U.S. Pat. No. 4,587,114 details a method for separating CO from mixed gases. The adsorbent used in this process is obtained by impregnation of a carbon support with various copper salts. The adsorbent produced is claimed to be stable with respect to the water content in the feed gas owing to the hydrophobic nature of the carbon support. Thus, no special dehydration process is necessary.

The prior art has failed to address an adsorbent arrangement and corresponding process that preferentially absorbs CO in the presence of $H_2$, $CH_4$, $CO_2$ and $N_2$, while protecting cuprous compound active sites on the adsorbent from degradation by feed gas-borne water and potentially ammonia in a pressure swing adsorption operation. This problem is overcome by the present invention as set forth below.

BRIEF SUMMARY OF THE INVENTION

The present invention is an adsorbent bed for adsorbing carbon monoxide from a feed gas stream containing at least carbon monoxide, moisture, hydrogen, methane, nitrogen and carbon dioxide, comprising: an adsorbent vessel with a feed orifice and a product orifice, a cuprous compound-containing main adsorbent near the product orifice for reversibly, by pressure swing, adsorbing carbon monoxide preferentially over hydrogen, methane, nitrogen and carbon dioxide, and a pretreatment layer between the feed orifice and the main adsorbent comprising at least a 3A molecular sieve zeolite which reversibly, by pressure swing, adsorbs moisture preferentially over carbon monoxide, methane, nitrogen and carbon dioxide.

Preferably, two or more said adsorbent beds are connected in parallel with appropriate valving so that at least one bed receives feed gas while one or more other beds are regenerated.

Preferably, an intermediate adsorbent layer of a low surface area basic metal compound, which preferentially adsorbs acidic compounds which migrate from the main adsorbent, is situated between said pretreatment layer and said main adsorbent in said adsorbent bed.

Preferably, the intermediate adsorbent layer is zinc oxide.

Alternatively, the intermediate adsorbent layer is calcium carbonate.

The present invention is also a method of preferentially adsorbing carbon monoxide from a feed gas stream comprising at least hydrogen, carbon monoxide, carbon dioxide, methane, nitrogen and moisture, comprising contacting said feed gas stream at elevated pressure with an adsorbent bed in an adsorbent vessel having a feed orifice and a product orifice, a cuprous compound-containing main adsorbent near the product orifice for reversibly, by pressure swing, adsorbing carbon monoxide preferentially over hydrogen, methane, nitrogen and carbon dioxide, and a pretreatment layer between the feed orifice and the main adsorbent comprising at least a 3A molecular sieve zeolite which reversibly, by pressure swing, adsorbs moisture preferentially over carbon monoxide, methane, nitrogen and carbon dioxide.

Preferably, two or more said adsorbent beds are connected in parallel with appropriate valving so that at least one bed receives feed gas at elevated pressure, while one or more other beds are regenerated at lower pressure.

Preferably, an intermediate adsorbent layer of a low surface area basic metal compound, which preferentially adsorbs acidic compounds which migrate from the main adsorbent, is situated between said pretreatment layer and said main adsorbent in said adsorbent bed.

Preferably, the intermediate adsorbent layer is zinc oxide.

Alternatively, the intermediate adsorbent layer is calcium carbonate.

Preferably, each bed is operated through the series of steps, comprising: introduction of said feed gas stream at elevated pressure to reversibly, by pressure swing, adsorb moisture on said pretreatment layer and carbon monoxide on said main adsorbent while a portion of said feed gas stream passes through said bed unadsorbed; depressurization to remove void space gas and desorb at least some adsorbed gas; purging with a stream of carbon monoxide to displace any non-carbon monoxide gas components; evacuating to recover a high purity carbon monoxide product and regenerate the adsorbent; and repressurizing with a portion of said feed gas stream which passes through said bed unadsorbed.

Preferably, the depressurization is performed countercurrent to the introduction of said feed gas stream, said purging is performed cocurrent to the introduction of said feed gas stream, said evacuation is performed countercurrent to the introduction of said feed gas stream and said repressurization is conducted countercurrent to the introduction of said feed gas stream.

DETAILED DESCRIPTION OF THE INVENTION

The present invention describes a pretreatment layer composition for the removal of trace impurities, like water and ammonia, from a feed gas stream during CO vacuum swing adsorption (VSA) in a cuprous compound-containing main adsorbent bed. Vacuum swing adsorption is a distinct subset of pressure swing adsorption, where a gas specie is selectively adsorbed at high pressure and desorbed at lower pressure or vacuum, i.e., reversible by pressure swing. The desired properties of the pretreatment layer include 1) ability to reversibly adsorb water and potentially ammonia, 2) limited or no adsorption of other bulk gas components and 3) HCl and other acid gas resistance.

3A zeolite has been found to accomplish these results, particularly when used in conjunction with zinc oxide or other basic metal compounds for acid gas resistance. 3A zeolite is a commercially available (Siliporite NK 30 3A zeolite available from CECA, Inc.) synthetic zeolite of the type A aluminosilicate which has effective pore openings of approximately 3 Angstroms.

The feed stream to most CO VSA systems is steam-methane reformer (SMR) off-gas consisting of $H_2$, CO, $CO_2$, $CH_4$ and $N_2$. In addition to these bulk components, the SMR off-gas also contains various trace impurities including water and ammonia. It is required that water is removed prior to the cuprous compound-containing main bed CO adsorbent since water will deactivate the adsorbent by strong adsorption followed by oxidation of Cu(I) to Cu(II) and may also lead to corrosion problems due to migration of water soluble salts (like $CuCl_2$) on the adsorbent surface. Ammonia present in the feed stream will adsorb strongly on the main adsorbent and thereby reduce its CO capacity. Numerous commercial adsorbents are available for VSA removal of water and ammonia. However, another key requirement of the pretreatment system is minimal adsorption of the bulk gas components since strongly adsorbed species will end up in the CO vacuum product. 3A zeolite satisfies the requirements of water and ammonia adsorption and non-adsorption of other bulk components in the SMR off-gas. Since of the gases present in the feed only water, ammonia and hydrogen are small enough to be adsorbed on 3A zeolite, contamination of product purity by co-adsorbed $CO_2$, $CH_4$ and $N_2$ can be avoided.

Another desired property of the pretreatment system is acid resistance. Contact of the main bed adsorbent and the pretreatment layer can result in the migration of various species present on the main bed adsorbent to the pretreatment layer particularly if water breakthrough to the main adsorbent occurs. The migration of these acid compound species ($CuCl_2$, $NH_4Cl$ and HCl) to 3A zeolite may result in damage to the crystal structure. Hence, it is desired to place an acid resistant intermediate adsorbent layer between 3A zeolite and the main bed adsorbent. The key requirements of that material is acid resistance and low capacity for other bulk feed gas components. Materials which satisfy these requirements include ZnO, calcium carbonate and low surface area alumina and titania, as well as other low surface area basic metal compounds.

The cuprous compound supported in the main adsorbent bed can be the reduction product of cupric halides, such as chlorides, fluorides and bromides, as well as salts of oxygen acids or organic acids, such as cupric formate, acetate, sulfate, nitrate, fluorsilicate, chlorate, perchlorate, bromate and borate, cupric dichromate and amine complex salts, such as cupric hexamine dichloride, and mixtures thereof. Supports for the cuprous compound can include alumina and silica-alumina materials.

EXAMPLE 1

Experiments were carried out in a pilot development unit to test the effect of a pretreatment layer on the performance of a CO VSA process. The unit consists of four beds, 12 feet long and 2 inches in diameter. Each adsorbent bed comprises an adsorbent vessel with a feed orifice where the feed gas stream is introduced and the adsorbed carbon monoxide is recovered during evacuation and a product orifice at the opposite end of the vessel where a hydrogen-rich product of unadsorbed components of the feed gas stream is removed. Two of the beds were filled with CuCl on alumina adsorbent produced as per U.S. Pat. No. 5,126,310, where $CuCl_2$ is impregnated on alumina in the presence of ammonium citrate and then dried and activated at elevated temperature, while the two other beds contained 5A zeolite for $H_2$ purification. Only the VSA cycle for the two beds used for CO recovery will be described. The steps include (1) pressurization with pure $H_2$ countercurrent to the direction of feed to a superambient pressure (245 psig), (2) feed with a gas mixture containing 67% $H_2$, 21% CO, 5% $CH_4$, 6% $CO_2$ and 1% $N_2$ at 245 psig, (3) cocurrent depressurization of the column to 5 psig. (This depressurization effluent is recycled to the feed end of the bed to insure high CO recovery), (4) cocurrent purge with product CO at 5 psig and (5) evacuation of pure CO product at a vacuum level of 80 torr. then the cyclic process is continued from steps 1 through 5. The important process parameters include the evacuated CO product and the product impurity levels of $CO_2$, $CH_4$ and $H_2$. The results of pilot development unit testing both with and without a 3A zeolite pretreatment layer in conjunction with the CuCl on alumina main adsorbent are given in Table 1.

TABLE 1

| Adsorbent(s) | Wet or Dry Feed | (mmole/ cycle) CO Evac | (ppm) CH$_4$ impurity | (ppm) H$_2$ impurity | (%) CO$_2$ impurity |
| --- | --- | --- | --- | --- | --- |
| CuCl/Alumina | Dry | 5.6 | 60 | 280 | 0.7 |
| CuCl/Alumina and 3A | Dry | 5.5 | 80 | 4400 | 0.7 |
| CuCl/Alumina and 3A | Wet | 5.1 | 100 | 2000 | 0.8 |

In the first experiment, 12 feet of CuCl on alumina was used exclusively as the adsorbent. In subsequent experiments, 9 inches of UOP 3A zeolite and 11.25 feet of CuCl on alumina was employed. When using dry feed gas, the use of a 3A zeolite pretreatment layer did not significantly change the CO evacuation quantity and the CO$_2$ impurity level. The CH$_4$ impurity showed a slight change and only the H$_2$ impurity level was greatly effected. This is because only H$_2$ of all the feed gas components is small enough to enter the pore structure of 3A and thereby end up in the evacuated CO product. When wet feed was introduced into the column, a factor of two reduction in the H$_2$ impurity level was noted, with only minor changes in the CH$_4$ and CO$_2$ impurity levels. This is because water can also enter the pores of 3A zeolite and is more strongly adsorbed than H$_2$ thereby displacing it from the adsorption space. This in turn reduces the H$_2$ impurity level in the evacuated CO product. The results given in Table 1 show that a pretreatment system consisting of 3A zeolite is capable of drying the inlet feed stream while only slightly changing the CH$_4$ and CO$_2$ impurity levels in the CO product. The H$_2$ impurity level is more drastically effected by the presence of 3A zeolite owing to its small molecular diameter. However, the results presented show that the presence of water vapor in the feed gas greatly effects the H$_2$ content in the product. Thus, by modification of the inlet water partial pressure or effectively sizing the pretreatment bed the H$_2$ impurity level can be controlled.

The present invention will now be set forth in greater detail with reference to a preferred embodiment. A synthesis gas or gas mixture containing at least hydrogen, carbon monoxide, carbon dioxide, methane, water and possibly nitrogen and argon is produced such as by steam methane reformation. This gas mixture is cooled by appropriate heat exchange equipment and then enters a carbon monoxide vacuum swing adsorptive (VSA) adsorbent bed having a pretreatment layer of 3A zeolite followed by a layer of ZnO and finally a supported cuprous chloride main adsorbent, where water, ammonia and carbon monoxide, respectively, are selectively adsorbed in series over the other gas mixture components. Some hydrogen is coadsorbed in the 3A zeolite. The remaining gas mixture passes through the carbon monoxide VSA adsorbent bed in an unadsorbed relatively high pressure condition. The adsorbed water, ammonia and carbon monoxide are then withdrawn countercurrent to feed at lower pressure (preferably vacuum) from the carbon monoxide VSA adsorbent bed to produce a relatively pure wet carbon monoxide product. Typically, the pressure of the gas mixture stream entering the carbon monoxide VSA adsorbent bed is between 15 and 600 psia. The composition of this stream typically ranges as follows: 20–80 vol % hydrogen, 15–70 vol % carbon monoxide, 3–25 vol % carbon dioxide, 0–10 vol % methane, 0–5 vol % nitrogen, and 0–1 vol % argon with 200 to 10,000 ppm of water and 500 to 1 ppm of ammonia. An example of a synthesis gas exiting a steam-methane reformer utilizing carbon dioxide import, such as would be representative of one embodiment of the reformation reaction, would include on a dry volume percent basis approximately 60% hydrogen, 30% carbon monoxide, 9.65% carbon dioxide, 0.25% methane, 0.10% nitrogen and saturation with water with trace amounts of ammonia.

The carbon monoxide product withdrawn from the carbon monoxide VSA adsorbent bed would be recovered at approximately 15 psia. It can then typically be compressed to product delivery pressures ranging from 20 to 700 psia. The purity of the carbon monoxide product stream varies depending upon the feed composition and the feed pressure, but a typical carbon monoxide product specification would be in volume percent 99.9% carbon monoxide, less than 100 ppm of hydrogen, less than 100 ppm carbon dioxide, less than 25 ppm of methane and less than 25 ppm nitrogen. The adsorptive separation cycle used in the carbon monoxide VSA adsorbent bed can be any of a series of pressure or vacuum swing adsorptive separations typically utilizing multiple beds commonly manifolded for sequential operation in known manners of adsorption, depressurization and regeneration, but preferably the carbon monoxide VSA adsorbent bed would be operated in the manner of U.S. Pat. No. 4,913,709 which is incorporated by reference herein in its entirety. Those beds would constitute a plurality of parallel connected beds of 4 to 5 in number which are operated in the sequence of adsorption, depressurization to remove void space gas and desorb adsorbed gas, purging the bed with a stream of carbon monoxide to displace any non-carbon monoxide codes or components, evacuating the bed to recover a high purity carbon monoxide product and pressurizing the bed with a portion of the gas stream which passes through the carbon monoxide VSA adsorbent bed unadsorbed. The bed is then regenerated and is ready to accept feed gas mixture to continue the cyclic process. In order to maintain continuous processing of the gas mixture and recovery of carbon monoxide product, the various beds are in phased time sequence in their operations so that at any one point in time at least one bed is on adsorption while the other beds are in various stages of depressurization, purge, evacuation and repressurization. The carbon monoxide selective adsorbent is typically selected from adsorbents containing monovalent copper impregnated upon alumina or silica-alumina supports having high surface area and a high dispersion of the monovalent copper on the surface of the support. Such a copper impregnated adsorbent exhibits unique capability to selectively adsorb carbon monoxide out of a gas stream containing carbon dioxide and methane, as well as other constituents denominated above; the selectivity of carbon monoxide over carbon dioxide and methane of such an adsorbent surpasses traditional zeolitic adsorptive characteristics and allows the economic production of a high purity carbon monoxide product satisfactory to high purity end users such as in the urethane precursor industry and the polycarbonate industry.

The present invention is a new approach to remove water vapor from CO-containing streams in VSA operation. Previous attempts to solve this problem have included 1) water removal prior to the VSA in a temperature swing adsorption TSA system, 2) water removal prior to the VSA system by cooling and condensation and 3) use of carbon-based, water resistant VSA adsorbents. The current invention uses a pretreatment section of 3A zeolite in the VSA bed to remove water and ammonia in pressure swing adsorption utilizing the economic operation of reversible pressure swing to adsorb and desorb the water and ammonia in concert with or simultaneous to the CO adsorption and desorption. There are a number of advantages of the current technique over previous solutions. Firstly, use of a TSA system requires extra adsorbent vessels and capital expenditure, a heat source and dry gas to regenerate the system. If $H_2$-rich effluent from the CO VSA is used as regeneration gas, large gas volumes are needed due to the low heat capacity of $H_2$. If CO-rich streams are used, a significant reduction in CO recovery results. Condensation for water removal requires a large heat exchanger to cool the gas down to low enough temperature for effective removal efficiencies. The feed gas must then be raised to superambient temperatures, since optimum performance of the CO VSA occurs between 50° and 70° C. Finally, carbon-based adsorbents, while somewhat water resistant, demonstrate more impurity co-adsorption than alumina-based adsorbents and thereby produce more impure CO. Thus, using a pretreatment layer in the CO VSA bed eliminates a lot of these problems. In addition, in order to achieve the desired vacuum levels water-sealed vacuum blowers are used. Hence, the evacuated CO product is always wet whether or not the water was removed prior to the VSA. Therefore, in the present invention all the feed gas water is removed from the system in a TSA product drier, while in the case of front-end TSA or condensation, water is removed in a front-end drier or a condenser and a back-end drier.

The present invention has been set forth with regard to a preferred embodiment, but the full scope of the invention should be ascertained from the claims which follow.

We claim:

1. A method of preferentially adsorbing carbon monoxide from a feed gas stream comprising at least hydrogen, carbon monoxide, carbon dioxide, methane, nitrogen and moisture, comprising contacting said feed gas stream at elevated pressure with an adsorbent bed in an adsorbent vessel having a feed orifice and a product orifice, a cuprous compound-containing main adsorbent near the product orifice for reversibly, by pressure swing, adsorbing carbon monoxide preferentially over hydrogen, methane, nitrogen and carbon dioxide, a pretreatment layer between the feed orifice and the main adsorbent comprising at least a 3A molecular sieve zeolite which reversibly, by pressure swing, adsorbs moisture preferentially over carbon monoxide, methane, nitrogen and carbon dioxide and an intermediate adsorbent layer of a low surface area basic metal compound, which preferentially adsorbs acidic compounds which migrate from the main adsorbent, situated between said pretreatment layer and said main adsorbent.

2. The method of claim 1 wherein two or more said adsorbent beds are connected in parallel with appropriate valving so that at least one bed receives feed gas at elevated pressure, while one or more other beds are regenerated at lower pressure.

3. The method of claim 2 wherein each bed is operated through the series of steps, comprising: introduction of said feed gas stream at elevated pressure to reversibly, by pressure swing, adsorb moisture on said pretreatment layer and carbon monoxide on said main adsorbent while a portion of said feed gas stream passes through said bed unadsorbed; depressurization to remove void space gas and desorb at least some adsorbed gas; purging with a stream of carbon monoxide to displace any non-carbon monoxide gas components; evacuating to recover a high purity carbon monoxide product and regenerate the adsorbent; and repressurizing with a portion of said feed gas stream which passes through said bed unadsorbed.

4. The method of claim 3 wherein said depressurization is performed countercurrent to the introduction of said feed gas stream, said purging is performed cocurrent to the introduction of said feed gas stream, said evacuation is performed countercurrent to the introduction of said feed gas stream and said repressurization is conducted countercurrent to the introduction of said feed gas stream.

5. The method of claim 1 wherein said intermediate adsorbent layer is zinc oxide.

6. The method of claim 1 wherein said intermediate adsorbent layer is calcium carbonate.

7. An adsorbent bed for adsorbing carbon monoxide from a feed gas stream containing at least carbon monoxide, moisture, hydrogen, methane, nitrogen and carbon dioxide, comprising: an adsorbent vessel with a feed orifice and a product orifice, a cuprous compound-containing main adsorbent near the product orifice for reversibly, by pressure swing, adsorbing carbon monoxide preferentially over hydrogen, methane, nitrogen and carbon dioxide, a pretreatment layer between the feed orifice and the main adsorbent comprising at least a 3A molecular sieve zeolite which reversibly, by pressure swing, adsorbs moisture preferentially over carbon monoxide, methane, nitrogen and carbon dioxide and an intermediate adsorbent layer of a low surface area basic metal compound, which preferentially adsorbs acidic compounds which migrate from the main adsorbent, situated between said pretreatment layer and said main adsorbent.

8. The apparatus of claim 7 wherein two or more said adsorbent beds are connected in parallel with appropriate valving so that at least one bed receives feed gas while one or more other beds are regenerated.

9. The apparatus of claim 7 wherein said intermediate adsorbent layer is zinc oxide.

10. The apparatus of claim 7 wherein said intermediate adsorbent layer is calcium carbonate.

* * * * *